United States Patent [19]

Nantau et al.

[11] 3,815,951

[45] June 11, 1974

[54] VEHICLE BODY RETRACTABLE TOP

[75] Inventors: Wayne E. Nantau, Fraser; Samuel C. Pollock, Rochester, both of Mich.

[73] Assignee: General Motors Corporation, Detroit, Mich.

[22] Filed: Aug. 8, 1973

[21] Appl. No.: 386,604

[52] U.S. Cl. ...... 296/137 F, 296/137 H, 296/137 G
[51] Int. Cl. .............................................. B60j 7/00
[58] Field of Search ......... 296/137 B, 137 E, 137 F, 296/137 G, 137 H

[56] References Cited
UNITED STATES PATENTS

| | | | |
|---|---|---|---|
| 2,193,607 | 3/1940 | Votypka | 296/137 F |
| 2,215,022 | 9/1940 | Votypka | 296/137 E |
| 2,968,514 | 1/1961 | Golde | 296/137 F |

*Primary Examiner*—Allen N. Knowles
*Attorney, Agent, or Firm*—J. A. Kushman

[57] ABSTRACT

A vehicle body retractable top including a pair of roof panels movable in a generally translatory manner between raised positions closing forward passenger and driver roof openings and rearward storage positions below a fixed rear roof portion to the rear of these openings. The rear ends of the roof panels are slidably supported by elongated inboard and outboard guides whose forward ends have arcuately curved configurations oriented so as to move the rear ends of the panels downwardly and inwardly as the panels move rearwardly from the raised position in a manner that prevents interference between the panels and the rear roof portion. A pair of drive cables driven by an electric drive motor are respectively connected to the roof panels through overcenter links that move into overcenter locked positions as the panels are driven to the raised positions so as to thereby secure the panels in position and relieve the cables of their normal driving forces. Actuation of the drive motor so as to drive the roof panels to the storage positions causes the drive cables to move the links to released positions and thereafter drive the roof panels rearwardly to the storage positions.

4 Claims, 8 Drawing Figures

VEHICLE BODY RETRACTABLE TOP

BACKGROUND OF THE INVENTION

This invention relates generally to vehicle body retractable tops in which roof panels are movable in a generally translatory manner between forward raised positions closing roof openings and rearward storage positions so as to provide convertible-like vehicles.

In order to provide an aesthetically appealing appearance to vehicles with retractable tops, it is desirable for the roof panels to have a flush positioning with respect to fixed adjacent roof portions while located in the raised positions. This necessarily requires that the roof panels be shifted downwardly while moving from the raised positions toward the storage positions in order to prevent interference with the adjacent fixed roof portions. However, with certain vehicle roof configurations, this downward shifting does not necessarily prevent interference between the outboard edges of the roof panels and the adjacent outboard side portions of the fixed roof portions.

SUMMARY OF THE INVENTION

The retractable top of this invention includes a pair of roof panels movable in a generally translatory manner between raised positions closing forward passenger and driver roof openings and rearward storage positions in a manner that prevents interference of the roof panels and the fixed roof portion of the vehicle behind the roof openings.

One of the features of the invention is that the rear ends of the roof panels are slidably supported by inboard and outboard guides which extend longitudinally relative to the vehicle and have forward ends with arcuately curved configurations oriented in a manner that moves the rear ends of the panels downwardly and inwardly as the panels move rearwardly from the raised positions so as to prevent interference of the roof panels with the rear roof portion. Another feature of the invention is that the forward curved configurations of the rear roof guides are located in planes oriented generally at 45° with respect to the horizontal so as to provide this movement of the rear ends of the roof panels. Another feature of the invention is that the roof panels are driven by a pair of drive cables respectively connected to the panels by overcenter links that are driven to overcenter locked positions as the panels reach the raised positions to secure the panels in position and relieve the cables of driving forces. Another feature of the invention is that the drive cables move the overcenter links to released positions and thereafter drive the roof panels from the raised positions to the storage positions upon selective actuation of a drive motor that drives the cables.

BRIEF DESCRIPTION OF THE DRAWINGS

The objects, features and advantages of the vehicle body retractable top of this invention are readily apparent from the following detailed description of the preferred embodiment and the drawings in which.

DETAILED DESCRIPTION OF THE PREFERRED EMBODIMENT

Figure 1:
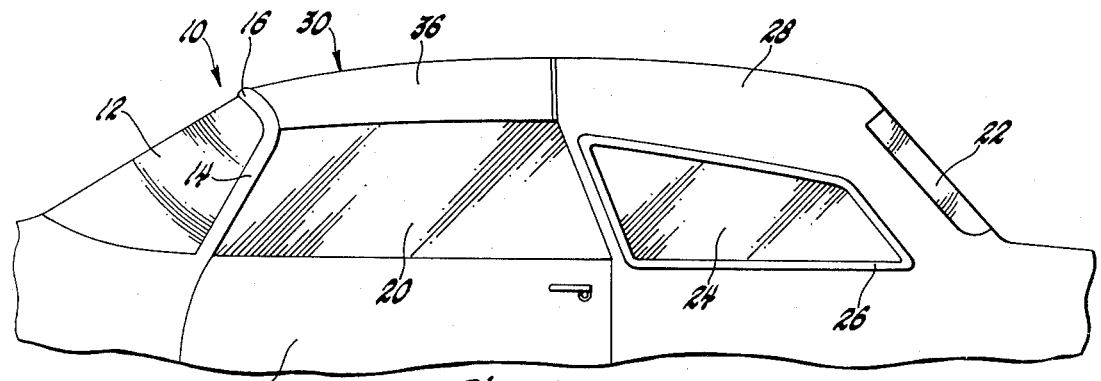
FIG. 1 is a side elevation view of a vehicle body including a retractable top, according to this invention, shown with the roof panels of the top in forward raised positions.
Figure 2:
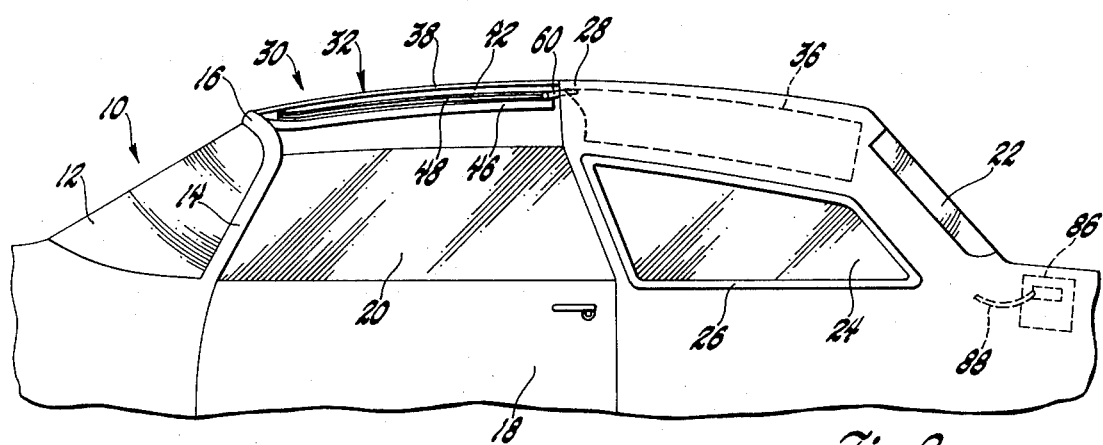
FIG. 2 is a view similar to FIG. 1 with the roof panels shown in rearward storage positions.
Figure 3:
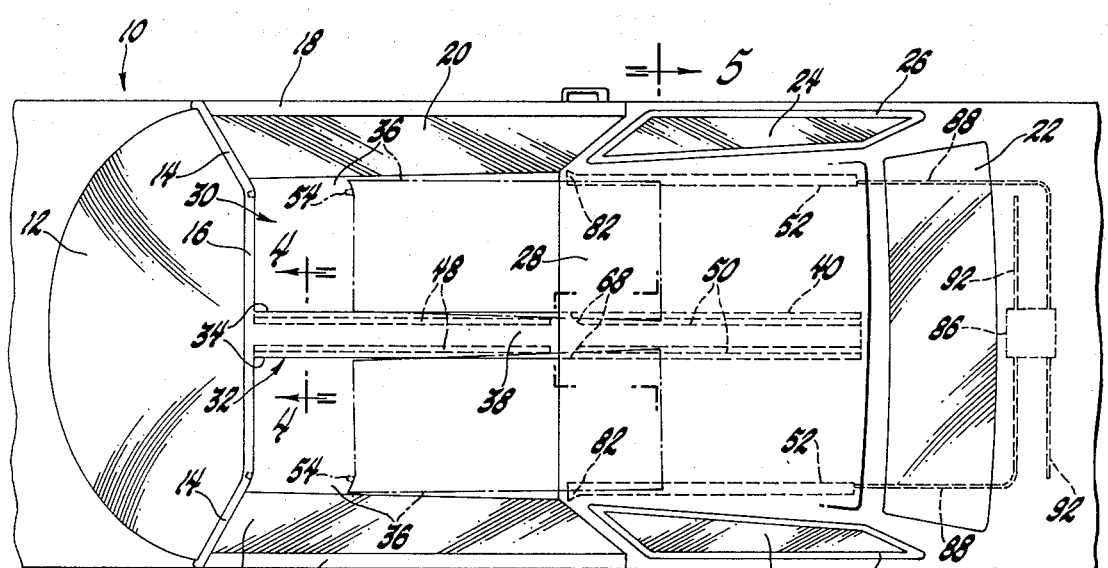
FIG. 3 is a top plan view of the vehicle body with the roof panels shown in the raised positions by solid lines and in partially stored positions by phantom lines.

Referring to FIGS. 1 through 3 of the drawings, a vehicle body generally indicated by 10 includes a front windshield 12 bounded at its lateral sides by windshield pillars 14 and at its upper side by a windshield header 16 extending between the upper ends of the windshield pillars. The vehicle body also includes front side doors 18 movable about their forward edges between open and closed positions and carrying movable side windows 20. The rearward portion of the vehicle body includes a rear window 22, rear side windows 24 which are fixed in position, and trim frames 26 bounding the rear side windows 24 in an aesthetically appealing manner. A rear roof portion 28 extends between the upper sides of the rear side windows 24 and covers the rear portion of the occupant compartment within vehicle body 10.

The vehicle body includes a retractable top, according to this invention, generally indicated by 30 and operable to selectively open and close the forward end of the vehicle body occupant compartment in a convertible-like manner. The retractable top includes a longitudinally extending strut 32 whose forward end is suitably fixed to the central portion of the windshield header 16 and which extends rearwardly to the central portion of the forward edge on rear roof portion 28 so as to define generally rectangular driver and passenger roof openings 34 as seen in FIG. 3. These roof openings are bounded at their forward ends by the windshield header 16, at their rearward ends by the forward edge of rear roof portion 28, at their inboard sides by the opposite sides of strut 32, and at their outboard sides by the upper edges of the side door windows 20.

Figure 4:
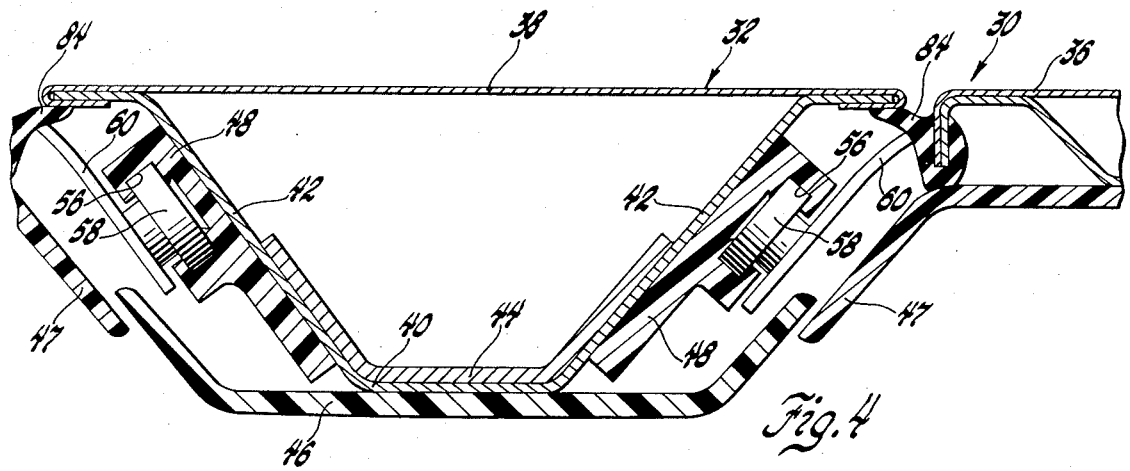
FIG. 4 is an enlarged cross-sectional view taken along line 4—4 of FIG. 3 and shows a strut that extends between the driver and passenger roof openings of the vehicle body and mounts guides which support the forward inboard ends of the roof panels.
Figure 5:
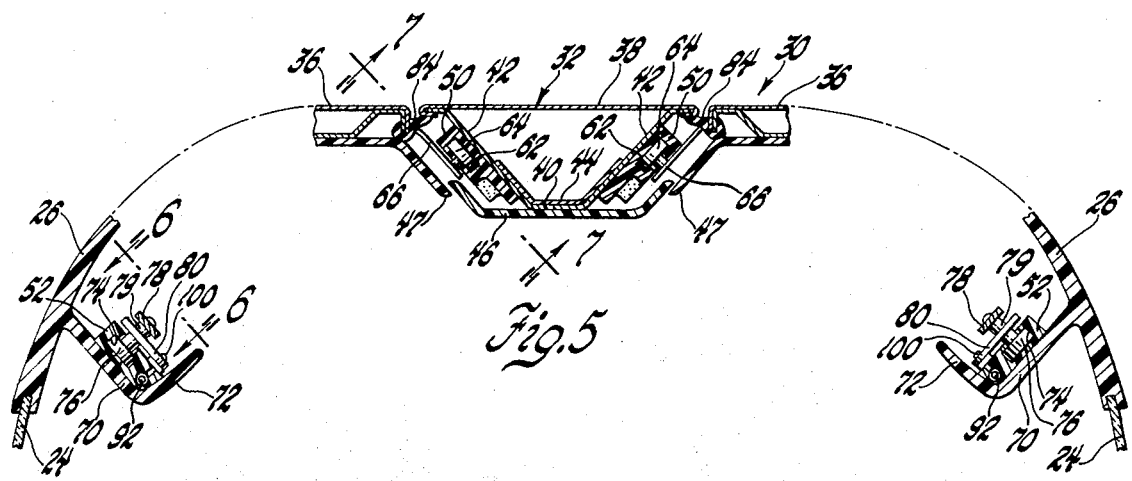
FIG. 5 is an enlarged broken away cross-sectional view taken generally along line 5-5 of FIG. 3 and shows quides which support the rear inboard and outboard ends of the roof panels.

Retractable top 30 includes a pair of movable roof panels 36 respectively associated with the roof opening 34 on each side of vehicle body 10. These roof panels are movable in a generally translatory manner between the forward raised positions closing roof openings 34, as shown by FIG. 1 and by the solid line indicated positions of the roof panels in FIG. 3, and rearward storage positions below the rear roof portion 28, as shown by FIG. 2. The strut 32 includes an outer panel 38 that defines the outer roof structure between the inboard edges of the raised panels 36, as seen in FIG. 3, and merges with the central forward edge of rear roof portion 28. An inner support panel 40 of the strut supports this outer panel as seen in FIGS. 4 and 5, and extends rearwardly to adjacent the rear end of rear roof portion 28 as shown by the hidden line configuration of this panel in FIG. 3. As best seen in FIGS. 4 and 5, support panel 40 includes side portions 42 along its length which are oriented in planes located generally at 45° to the horizontal in a V-shaped configuration. A reinforcing member 44 extends between the lower juncture of these side portions within the strut to add rigidity to the structure. The lower outer side of the support panel 40 attaches a trim panel 46 cooperating with flanges 47 of the roof headliner to hide the strut from a vehicle occupant's sight and thereby provide an aesthetically appealing appearance.

The strut 32 mounts guides which support the roof panels 36 for movement between their raised and storage positions. The guides associated with each roof panel are symmetrical about the center line of the vehicle with the guides of the other panel, and their general configuration is shown by hidden lines in FIG. 3. On the forward end of strut 32, inboard front guides 48 extend generally between the windshield header 16 and the forward edge of rear roof portion 28. Inboard rear guides 50 are mounted on the rear end of strut 32 and extend between the front and rear edges of rear roof portion 28. Outboard rear guides 52 extend along the outboard sides of rear roof portion 28 generally between the forward and rearward edges of this roof portion in the same manner as the inboard rear guides 50. The front outboard portions of the roof panels 36 are supported in the raised positions by pins 54, see the phantom line illustration of these pins in FIG. 3, that are received within suitable holes in the windshield header 16 as the roof panels move into the raised positions.

FIG. 4 shows an enlarged cross-sectional view of the inboard front guides 48. These guides have channel-shaped configurations and are mounted at 45° with respect to the horizontal on the side portions 42 of strut inner support panel 40. Front guides 48 define channel openings 56 slidably receiving rollers or slide portions 58. Brackets 60 mounted on the forward inboard portions of roof panels 36 support these slide portions 58 so as to support the forward ends of roof panels 36 as the slide portions move along guides 48 during movement of roof panels 36 between the raised and storage positions.

Figure 7:
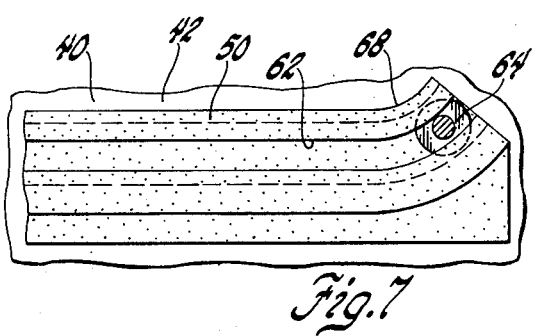

The central portion of FIG. 5 shows slightly enlarged cross-sectional views of the inboard rear guides 50. These guides also have channel-shaped configurations and are also mounted at 45° with respect to the horizontal on the side portions 42 of strut support panel 40. Rear guides 50 define channel openings 62 that slidably receive rollers or slide portions 64. Brackets 66 on the rear inboard ends of roof panels 36 mount the slide portions 64 so as to support the rear inboard portions of the roof panels as the slide portions 64 move along guides 50 during movement of the roof panels between the raised and storage positions. The forward ends of the rear guides 50 have arcuately curved configurations 68, see FIG. 7. Due to the positioning of the guides at 45° with respect to the horizontal, the forward ends of rear guides 50 thus extend upwardly and outwardly in a forwardly moving direction and rearwardly and inwardly in a rearwardly moving direction. The importance of this aspect of the guides will be hereinafter described.

Figure 6:
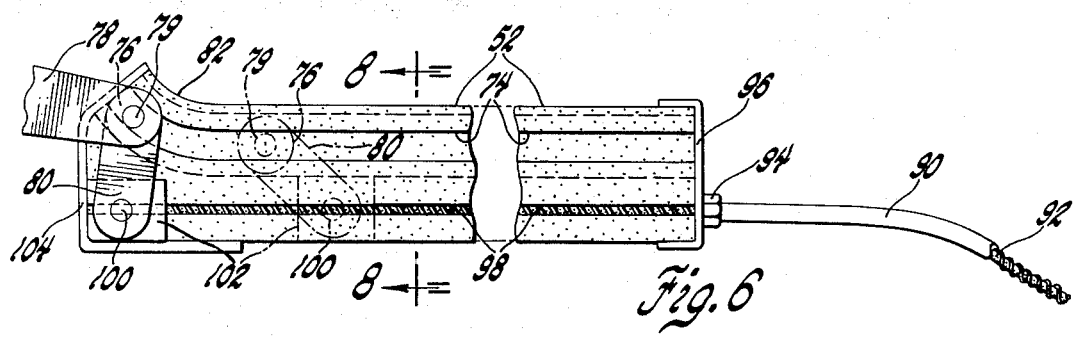
FIGS. 6 and 7 are enlarged views of the rear guides associated with the right-hand roof panel and are taken respectively along lines 6—6 and 7—7 of FIG. 5 so as to show the curved configurations of the forward ends of these guides which support this roof panel for movement in a manner according to this invention, and FIG. 6 also shows an overcenter link that is connected to the panel and to a drive cable so as to drive the panel between its raised and storage positions and to lock the panel in raised position upon movement thereto.
Figure 8:
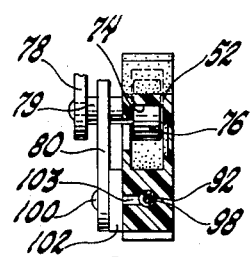
FIG. 8 is a cross-sectional view of the rear outboard guide taken along line 8-8 of FIG. 6 and shows the manner in which the overcenter link is connected to both the roof panel and the drive cable.

The outer portions of FIG. 5 show slightly enlarged cross-sectional views of the outboard rear guides 52 that extend longitudinally along the outboard sides of rear roof portion 28. Integral flanges 70 on the inside of the rear side window trim frames 26 mount guides 52 at 45° with respect to the horizontal in parallel relationship to the inboard rear guides 50. These flanges include integral lips 72 that hide the guides 52 from a vehicle occupant's sight to provide an aesthetically appealing appearance. The upper edges of guides 52 also have channel-shaped configurations and define channel openings 74 that receive rollers or slide portions 76. Brackets 78 mounted on the outboard rear ends of roof panels 36 carry pins 79, see FIG. 8, that support the slide portions 76 so as to thereby support the rear outboard ends of the roof panels 36 as the slide portions 76 move along guides 52 during movement of the roof panels between the raised and storage positions. Pins 79 also pivotally support the respective upper ends of a pair of overcenter links 80 whose function will be hereinafter described. FIG. 6 shows that the forward ends of guides 52 also have arcuately curved configurations 82 that are of the same radius as the arcuately curved configurations 68 on the forward ends of the inboard rear guides 50. The outboard rear guides 52 thus likewise extend outwardly and upwardly in a forward moving direction due to the skewed mounting of the guides with respect to the horizontal and extend inwardly and downwardly in a rearwardly moving direction for the same reason.

The arcuately curved configurations 68 and 82 of the rear inboard and outboard guides 50 and 52 provide the rear ends of the roof panels 38 with a desirable movement when the panels are located adjacent their raised positions. These arcuate configurations move the rear ends of the roof panels downwardly and inwardly from the flush raised positions as the panels initially move toward the storage positions. The downward shifting prevents interference of the forward edge of the rear roof portion 28 with rear edges of roof panels 36 along most of the width of these roof panels, and the inward shifting likewise prevents this interference at the outboard rear ends of the panels where the roof curvature extends downwardly. As the panels 36 move in an opposite direction toward the raised positions, their rear ends are moved outwardly and upwardly to the raised positions and allow effective sealing of seals 84 at their perimeters, FIGS. 4 and 5, as well as the aesthetically appealing flush appearance between the roof panels and the rear roof portion 28 and outer panel 38 of strut 32.

The roof panels 36 are driven between their raised and storage positions by an electric drive motor shown schematically by hidden lines in FIGS. 2 and 3 and indicated by 86. The drive motor drives a pair of flexible drive cables 88 respectively associated with the outboard rear guides 52 on eace side of the rear roof portion 28. The manner in which the right-hand cable drives the right-hand or passenger roof panel 36 will be described by reference to FIG. 6 with the understanding that the left-hand or driver roof panel is driven by the left-hand cable in the same manner. This cable includes an outer sheathing 90 that receives a drive element 92 driven in a push-pull manner by the drive motor 86. The rearward end of the sheathing 90 is secured to the motor 86 and its forward end is secured by a nut 94 to a bracket 96 on the rear end of guide 52. The drive element 92 extends through the nut 94 and into an elongated slot 98 extending along the lower side of guide 52. The lower end of overcenter link 80 is pivoted by a pin 100 to a member 102 with an integral projection 103 extending into slot 98 for attachment to the front end of drive element 92 in a suitable manner.

When the drive motor 86 pulls the drive element 92 rearwardly in a roof opening mode, the drive element pulls the overcenter link rearwardly in the position shown by phantom lines in FIG. 6 to thereby pull the associated roof panel 36 rearwardly toward storage position. In the roof closing mode of movement, the drive element 92 is pushed forwardly within guide 52 and pushes the overcenter link forwardly to thereby drive the roof panel toward raised position. Just before the roof panel 36 reaches its fully raised position where the roof panel is flush with the adjacent portions of the vehicle roof, the link 80 begins to pivot forwardly about pin 79 as slide portion 76 moves within arcuate configuration 82 of guide 52. The pin 100 at the lower end of link 80 thus moves forward of pin 79 and into the overcenter locked position shown by solid lines in FIG. 6 where the member 102 engages a stop bracket 104 mounted on the forward end of guide 52. This overcenter condition of link 80 maintains the roof panel 36 in raised position since attempted rearward movement of the roof panel pivots the link 80 clockwise about pin 100 and further engages the member 102 with the stop bracket 104, and the condition also relieves the drive cable 88 of driving forces it is subjected to during movement of the panel. However, upon actuation of the drive cable in a rearwardly moving direction, the link 80 pivots counterclockwise about pin 79 and moves pin 100 rearward of pin 79 so that link 80 moves to a released position, the phantom line position of FIG. 6, that allows the movement of the roof panel 36 to proceed toward storage position.

It is believed evident from the foregoing description that this invention provides an improved vehicle body retractable top.

What is claimed is:

1. In a vehicle body including a front windshield header and a rear roof portion closing the rear portion of the vehicle body occupant compartment, a retractable top for selectively closing the front roof opening defined between the windshield header and the forward edge of the rear roof portion, the top comprising, a central longitudinal strut extending from the central portion of the windshield header rearwardly to the forward edge of the rear roof portion so as to divide the roof opening into driver and passenger openings, the strut extending rearwardly from the forward edge of the rear roof portion to adjacent the rear edge of this roof portion, a pair of elongated front and rear guides extending along the respective sides of the strut in a symmetrical manner, the rear guides on the strut having curved configurations at their forward ends so as to extend upwardly and outwardly in a forwardly moving direction and downwardly and inwardly in a rearwardly moving direction, a pair of elongated rear guides respectively extending along the outboard sides of the rear roof portion and having curved configurations at their forward ends which lie in planes that are parallel to the planes of the curved forward ends of the associated guides on the respective adjacent sides of the strut, the curved forward ends of the outboard rear guides also extending upwardly and outwardly in a forwardly moving direction and downwardly and inwardly in a rearwardly moving direction, a pair of movable roof panels respectively associated with the driver and passenger roof openings, each movable roof panel having front and rear inboard slide portions respectively received by the associated front and rear guides on the strut and a rear outboard slide portion received by the associated rear guide on the outboard side of the rear roof portion, the roof panels being movable along the guides between forward raised positions closing the roof openings and rearward storage positions below the rear roof portion and the curved configurations of the forward ends of the rear guides moving the rear ends of the panels upwardly and outwardly as the panels move forwardly to the raised positions and inwardly and downwardly as the panels move rearwardly from the raised positions without interference with the rear roof portion, and locking means for selectively holding the panels in their raised positions.

2. In a vehicle body including a front windshield header and a rear roof portion closing the rear portion of the vehicle body occupant compartment, a retractable top for selectively closing the front roof opening defined between the windshield header and the forward edge of the rear roof portion, the top comprising, a central longitudinal strut extending from the central portion of the windshield header rearwardly to the forward edge of the rear roof portion so as to divide the roof opening into driver and passenger openings, the strut extending rearwardly from the forward edge of the rear roof portion to adjacent the rear edge of this roof portion and including a pair of elongated mounting portions extending along the length of the strut at the opposite sides thereof, elongated front and rear channel-shaped guides mounted on each side of the strut and positioned in respective planes oriented generally at 45° with respect to the horizontal, the forward ends of the rear guides having arcuately curved configurations within these planes so as to extend upwardly and outwardly in a forwardly moving direction and downwardly and inwardly in a rearwardly moving direction, a pair of elongated rear channel-shaped guides extending along the respective outboard sides of the rear roof portion in planes that are parallel to the planes of the associated rear guides on the respective adjacent sides of the strut, the rear guides on the roof portion having arcuately curved configurations at their forward ends which extend upwardly and outwardly in a forwardly moving direction and downwardly and inwardly in a rearwardly moving direction, a pair of movable roof panels respectively associated with the driver and passenger roof openings, each movable roof panel having front and rear inboard slide portions respectively received by the associated front and rear guides on the strut and a rear outboard slide portion received by the associated rear guide on the outboard side of the rear roof portion, the roof panels being movable along the guides between forward raised positions closing the roof openings and rearward storage positions below the rear roof portion and the curved configurations of the forward ends of the rear guides moving the rear ends of the panels upwardly and outwardly as the panels move forwardly to the raised positions and inwardly and downwardly as the panels move rearwardly from the raised positions without interference with the rear roof portion, power operated means for moving the panels between the raised and storage positions, and overcenter locking means for selectively holding the panels in the raised positions.

3. In a vehicle body including a front windshield header and a rear roof portion closing the rear portion of the vehicle body occupant compartment, a retractable top for selectively closing the front roof opening defined between the windshield header and the forward edge of the rear roof portion, the top comprising, a central longitudinal strut extending from the central portion of the windshield header rearwardly to the forward edge of the rear roof portion so as to divide the roof opening into driver and passenger openings, the strut extending rearwardly from the forward edge of the rear roof portion to adjacent the rear edge of this roof portion, a pair of elongated front and rear guides extending along the respective sides of the strut in a symmetrical manner, the rear guides on the strut having curved configurations at their forward ends so as to extend upwardly and outwardly in a forwardly moving direction and downwardly and inwardly in a rearwardly moving direction, a pair of elongated rear guides respectively extending along the outboard sides of the rear roof portion and having curved configurations at their forward ends which lie in planes that are respectively parallel to the planes of the curved forward ends of the associated guides on the strut, the curved forward ends of the outboard rear guides also extending upwardly and outwardly in a forwardly moving direction and downwardly and inwardly in a rearwardly moving direction, a pair of movable roof panels respectively associated with the driver and passenger roof openings, each movable roof panel having front and rear inboard slide portions respectively received by the associated front and rear guides on the strut and a rear outboard slide portion received by the associated rear guide on the outboard side of the rear roof portion, the roof panels being movable along the guides between forward raised positions closing the roof openings and rearward storage positions below the rear roof portion and the curved configurations of the forward ends of the rear guides moving the rear ends of the panels upwardly and outwardly as the panels move forwardly to the raised positions and inwardly and downwardly as the panels move rearwardly from the raised psitions without interference with the rear roof portion, power operated means including an electric drive motor, a pair of elongated drive cables respectively associated with the roof panels and having first ends adapted to be driven by the motor, a pair of overcenter links respectively associated with the roof panels and having first ends respectively connected to the panels, the overcenter links having second ends respectively connected to the second ends of the drive cables so as to selectively move the roof panels between the raised and storage positions upon actuation of the drive motor, and stop means for holding the links in overcenter locked positions as the roof panels move to the raised positions so as to thereby secure the roof panels in the raised positions until the cables drive the links to released positions as the motor is actuated to drive the roof panels to the storage positions.

4. In a vehicle body including a front windshield header and a rear roof portion closing the rear portion of the vehicle body occupant compartment, a retractable top for selectively closing the front roof opening defined between the windshield header and the forward edge of the rear roof portion, the top comprising, a central longitudinal strut extending from the central portion of the windshield header rearwardly to the forward edge of the rear roof portion so as to divide the roof opening into driver and passenger openings, the strut extending rearwardly from the forward edge of the rear roof portion to adjacent the rear edge of this roof portion and including a pair of elongated mounting portions extending along the length of the strut at the opposite sides thereof, elongated front and rear channel-shaped guides mounted on each side of the strut in a symmetrical manner and positioned in respective planes oriented generally at 45° with respect to the horizontal, the rear guides having curved configurations at their forward ends so as to extend upwardly and outwardly in a forwardly moving direction and downwardly and inwardly in a rearwardly moving direction, a pair of elongated rear channel-shaped guides respectively extending along the outboard sides of the rear roof portion in planes that are parallel to the planes of the associated rear guides on the respective adjacent sides of the strut, the rear guides on the roof portion having arcuately curved configurations at their forward ends which extend upwardly and outwardly in a forwardly moving direction and downwardly and inwardly in a rearwardly moving direction, a pair of movable roof panels respectively associated with the driver and passenger roof openings, each movable roof panel having front and rear inboard slide portions respectively received by the associated front and rear guides on the strut and a rear outboard slide portion received by the associated rear guide on the outboard side of the rear roof portion, the roof panels being movable along the guides between forward raised positions closing the roof openings and rearward storage positions below the rear roof portion and the curved configurations of the forward ends of the rear guides moving the rear ends of the panels upwardly and outwardly as the panels move forwardly to the raised positions and downwardly and inwardly as the panels move rearwardly from the raised positions without interference with the rear roof portion, power operated means including an electric drive motor and a pair of drive cables with first ends driven by the motor, a pair of overcenter links respectively associated with the roof panels and having first ends pivotally connected to the respective panels adjacent one of the rear slide portions of each panel, the overcenter links having second ends respectively connected to the second ends of the drive cables, means mounting the second ends of the cables along the rear guides that support the slide portions adjacent the overcenter links so that actuation of the drive motor selectively drives the panels between the raised and storage positions, and stops means mounted on the forward ends of the rear guides that support the cables so as to hold the links in overcenter locked positions as the roof panels move to the raised positions and to thereby relieve the drive cables of their normal driving forces until the motor is actuated to drive the links to released positions and the roof panels to the storage positions.

* * * * *